United States Patent [19]

Eimers et al.

[11] 4,456,717
[45] Jun. 26, 1984

[54] STABILIZER COMPOSITIONS, THEIR USE FOR STABILIZING THERMOPLASTIC, POLYCARBONATES AND STABILIZED THERMOPLASTIC POLYCARBONATES

[75] Inventors: Erich Eimers; Rolf Dhein, both of Krefeld; Klaus Kircher, Leverkusen, all of Fed. Rep. of Germany

[73] Assignee: Bayer Aktiengesellschaft, Leverkusen, Fed. Rep. of Germany

[21] Appl. No.: 502,357

[22] Filed: Jun. 8, 1983

[30] Foreign Application Priority Data

Jun. 16, 1982 [DE]  Fed. Rep. of Germany ....... 3222522

[51] Int. Cl.³ ..................... C08K 5/15; C08K 5/52
[52] U.S. Cl. ..................... 524/109; 252/400 R; 524/107; 524/117; 524/120; 524/128; 524/147; 524/151; 524/265
[58] Field of Search ............ 252/400.24, 400.31; 524/109, 117, 120, 128, 151

[56] References Cited

U.S. PATENT DOCUMENTS

| | | | |
|---|---|---|---|
| 4,066,611 | 1/1978 | Axelrod | 524/120 |
| 4,073,769 | 2/1978 | Eimers et al. | 260/45.8 R |
| 4,102,859 | 7/1978 | Eimers et al. | 524/109 |
| 4,225,483 | 9/1980 | Eimers et al. | 524/109 |
| 4,342,681 | 8/1982 | Idel et al. | 524/108 |
| 4,367,303 | 1/1983 | Eimers et al. | 524/109 |
| 4,375,525 | 3/1983 | Idel et al. | 524/109 |

FOREIGN PATENT DOCUMENTS 1561890  3/1980  United Kingdom.

OTHER PUBLICATIONS

Levantovskaya et al., Vysokom, Soed. X (1975), pp. 2331–2337.

*Primary Examiner*—John Kight, III
*Assistant Examiner*—R. A. White
*Attorney, Agent, or Firm*—Gene Harsh; Joseph C. Gil; Thomas W. Roy

[57] ABSTRACT

The present invention is directed to stabilizer compositions or thermoplastic polycarbonates based on phosphites and siloxane-oxetane compounds. These stabilizers protect the polycarbonate against heat and oxidative degradation, and in addition, increase the hydrolysis resistance of the polycarbonate. The present invention is also directed to a process for stabilizing polycarbonate and to the stabilized polycarbonate produced therefrom.

6 Claims, No Drawings

STABILIZER COMPOSITIONS, THEIR USE FOR STABILIZING THERMOPLASTIC, POLYCARBONATES AND STABILIZED THERMOPLASTIC POLYCARBONATES

BACKGROUND OF THE INVENTION

1. Field of the Invention

The present invention is directed to stabilizer compositions based on phosphites and siloxane-oxetane compounds, a process for stabilizing polycarbonate and the stabilized polycarbonates produced therefrom.

B 2. Description of the Invention

It is generally known that thermoplastics must be formulated with several additives concurrently in order to improve their properties and their stability. Apart from additives to improve the mold release, the flame resistance and the stability to light and weathering, in particular, stabilizers to improve the resistance to heat, moisture and air are added to the thermoplastics. The additives always contain a particular active group which is responsible for the specific effect of the additives. Accordingly, since it is usually necessary to employ several additives together, and since relatively large amounts of additive have more or less severely unfavorable effects on the physicomechanical properties of the thermoplastics, the aim is obviously to reduce as much as possible the amount added by adding those additives which have the lowest possible equivalent weight relative to their particular active group. On the other hand, this aim is restricted by the fact that the additives should have as low a volatility as possible and thus have as high molecular weight as possible, so that they cannot diffuse out of the thermoplastic again during or after its processing.

Thus, an object of the present invention is to provide stabilizers against thermo-oxidative degradation of polycarbonate which comply with these general requirements, that is to say additives which combine as low an active group equivalent weight as possible with as low a volatility as possible.

A further object is not to adversely affect the stability of the polycarbonate to hydrolysis by the addition of the stabilizers.

The stabilization of polycarbonate by the addition of phosphites has been known for a considerable time. However, the action of the phosphites principally involves reducing highly color-producing degradation products, which are formed during the preparation of the polycarbonate or its processing, to give colorless products (Levantowskaja et al, vysokom, Soed. X (1975), pages 2331-37).

The disadvantage of stabilization with phosphites is the severe brown discoloration of the substrate on relatively long exposure to air and heat. The long-term stability can be improved by the addition of specific phosphites having oxetane groups or by the addition of mixtures of phosphites and oxetane compounds (see German Offenlegungsschrift No. 2,140,207, German Offenlegungsschrift No. 2,510,463 and German Offenlegungsschrift No. 2,658,849).

It has now been found that a particularly favorable stabilizing action is obtained when combinations of phosphites and specific siloxanes containing oxetane groups are used. This is because these oxetane groups have, on the one hand, a relatively low equivalent weight per oxetane group and, on the other hand, nevertheless have a relatively low volatility.

This distinguishes the silicon-oxetane compounds of the present invention from the C-oxetane compounds described in German Offenlegungsschrift No. 2,510,463. It is true that silicon compounds are already mentioned in the form of esters of silicic acid with oxetane-containing alcohols in this patent specification. However, as is shown in the examples of the present application, the resistance to hydrolysis achieved with those type of silicic ester/phosphite mixtures is poorer than when using the phosphite/silicon-oxetane compositions according to the present invention. When using these stabilizer compositions, in some cases, the resistance to hydrolysis of unstabilized polycarbonate can even be exceeded. Moreover, the silicic esters of the formula

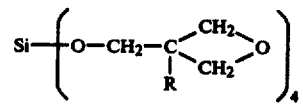

mentioned in German Offenlegungsschrift No. 2,510,463 are, in the case where $R=CH_3$ or $C_2H_5$, solid crystalline compounds. Obviously, metering compounds of this type into the polycarbonate, especially during a continuous process of manufacture, is more difficult and demands additional chemical engineering measures, in contrast to the use of the siloxanes according to the invention, which are liquid at room temperature.

Although, on the one hand, it is known that silicon-oxetane compounds do not adversely affect the stability to hydrolysis in phosphite-free polycarbonate (see German Offenlegungsschrift No. 2,920,450 and German Offenlegungsschrift No. 2,902,451) and although, on the other hand, it is known that the stability to hydrolysis of phosphite-stabilized polycarbonates can be improved by mixing in carboxylic esters containing oxetane groups (see German Offenlegungsschrift No. 2,658,849), it was nevertheless surprising that excellent results could be achieved with the inventive compositions with respect to both of stabilization towards thermal oxidation and stability to hydrolysis. This is surprising because it can be seen from German Offenlegungsschrift No. 2,726,662 that the stability to hydrolysis of phosphite-stabilized polycarbonate is adversely affected by the addition of the siloxane compounds mentioned therein (Example 3 of German Offenlegungsschrift No. 2,726,662).

Regarding phosphite-free siloxane stabilization according to German Offenlegungsschrift No. 2,920,450 and German Offenlegungsschrift No. 2,920,451, it has been found that the discoloration-reducing effect of this stabilization is very dependent on the batch and, in particular, is ineffective against certain color-producing degradation products which can only be decolorized by reducing agents.

Since in the course of continuous large-scale production certain variations in quality within a specified range of tolerance must always be expected, stabilization with siloxane but without phosphite leads to variable and thus unsatisfactory results with respect to the lightness of the color of the polycarbonate. In contrast, when using the stabilizer compositions according to the invention, completely uniform color quality can be guaranteed, irrespective of the batch.

SUMMARY OF THE INVENTION

The present invention is directed to stabilizer compositions containing
(a) phosphites of the formula (I) (a, b, c, and/or d)

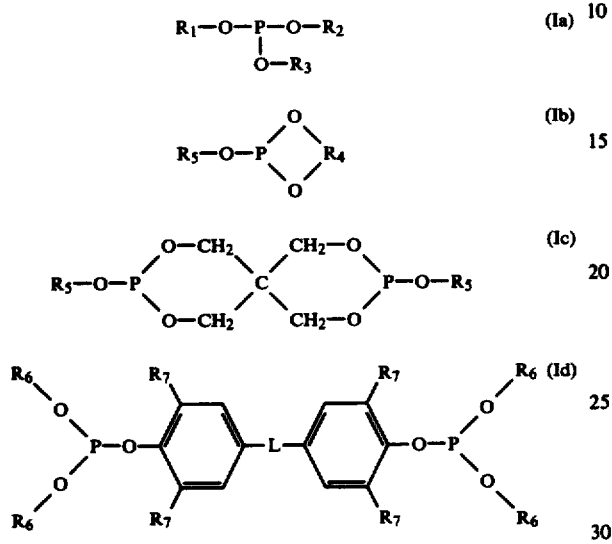

with
(b) siloxane compounds of the formula (II) which are liquid at room temperature (20° C.)

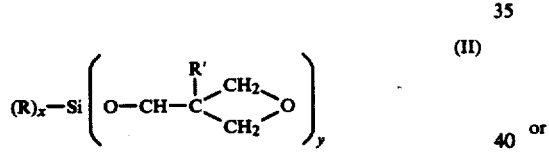

wherein the equivalent weight per oxetane group is less than 180, preferably less than about 160.

The phosphite-siloxane compositions according to the invention can also optionally contain siloxanes of the formula (III) (a and/or b)

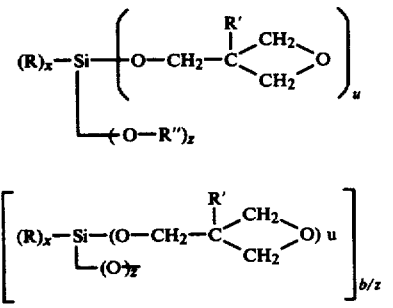

The equivalent weight per oxetane group of the combination of siloxanes of the formula (II) and formula (III) which are suitable according to the invention must also be less than 180, preferably less than about 160, that is to say that one gram equivalent of the oxetane group

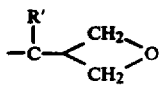

is allotted to a maximum of 180 g, preferably a maximum of about 160 of the mixture of (II) and (III).

The phosphite radicals

The radicals $R_1$, $R_2$ and $R_3$ are linear or branched $C_1$–$C_{18}$-alkyls or optionally substituted $C_6$–$C_{20}$-aryls, with the proviso that at least one of the radicals $R_1$, $R_2$ or $R_3$ is an aryl radical, preferably a substituted aryl radical and, in particular, an ortho-alkyl-substituted aryl radical. In addition to the alkyl substituents, $C_5$–$C_6$-cycloalkyl radicals and phenyl radicals are also suitable as substituents on the aryl radicals.

$R_4$ is a $C_2$–$C_5$-alkylene or a divalent radical of a $C_6$–$C_{30}$-aryl ring system, such as, for example, a radical of the formulae

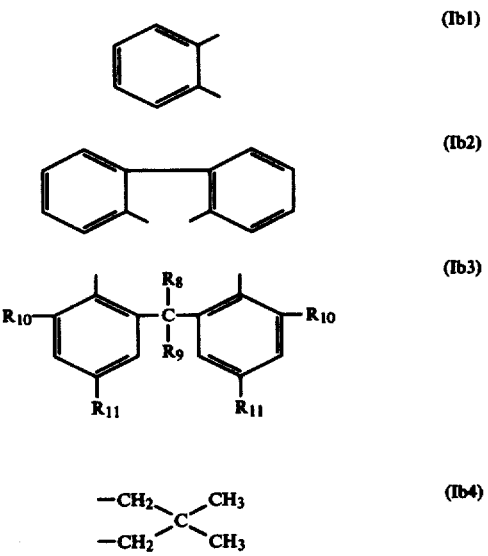

$R_5$ is a linear or branched $C_1$–$C_{18}$-alkyl, a $C_5$–$C_{14}$-cycloalkyl or a $C_6$–$C_{20}$-aryl radical, which may also contain alkyl and/or hydroxyl substituents, with the proviso that at least one C atom, which is directly bonded to the oxygen of the phosphorus acid, of each of the possible radicals $R_4$ and $R_5$ is a constitutent of an aromatic ring.

$R_6$ is substituted or unsubstituted $C_6$–$C_{14}$-aryl, $R_7$ is H or $C_1$–$C_6$-alkyl and L is —O—, a $C_1$–$C_6$-alkylidene or a single bond.

$R_8$ and $R_9$ are identical or different and denote H or $C_1$–$C_6$-alkyl; $R_{10}$ and $R_{11}$ are linear or branched $C_1$–$C_6$-alkyls or cyclohexyl.

The siloxane radicals

R is H or a linear or branched $C_1$–$C_{14}$-alkyl, which may contain ether oxygen atoms, a $C_5$–$C_{14}$-cycloalkyl, which may be alkyl-substituted, or a substituted or unsubstituted $C_6$–$C_{14}$-aryl.

R' is a $C_1$–$C_6$-alkyl, a $C_5$–$C_6$-cycloalkyl or a phenyl, preferably a $C_1$–$C_2$-alkyl.

R" is $C_1$–$C_2$-alkyl, preferably $CH_3$— or $C_6H_5$.

In formula (II), "x" is 1 or 2, "y" is 2 or 3 and "x+y"=4.

In formula (IIIa), "x" is 1 or 2, "u" is zero, 1 or 2, "z" is 1, 2, or 3 and "x+u+z"=4.

The radical R" may, for example, also be the radical of a polyhydric aliphatic alcohol A, from which siloxanes of the formula (IIIb) result,

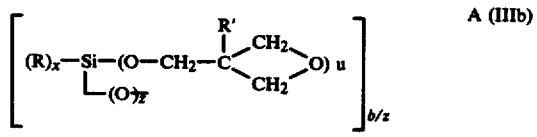

wherein

R, R', x, u and z have the meaning mentioned for formula IIIa and b is a whole number from 2 to 6 and thus A is the radical of an alkylene with 2 to 6 bonds.

The phosphite components and the siloxane components have a boiling point of at least 250° C.

The ratio of mixing of the siloxanes which are to be employed according to the invention to the phosphites which are to be employed according to the invention corresponds to 1 to 10 oxetane-group equivalents, preferably 4 to 8 oxetane-group equivalents, per atom of phosphorus.

The concentration of the stabilizer composition in the polycarbonate is between about 0.01 and 1 part of the combination per 100 parts of polycarbonate and stabilizer.

The weight concentration of phosphorus in the stabilized polycarbonate is about 10 to 200 ppm, preferably about 20 to 100 ppm.

The present invention additionally relates to the use of a stabilizer composition according to the invention to stabilize aromatic, thermoplastic polycarbonates, in amounts from about 0.01 to 1% by weight, preferably from about 0.02 to 0.5% by weight, and in particular from about 0.02 to 0.3% by weight, relative to the total weight of thermoplastic polycarbonate and stabilizer composition.

The present invention additionally relates to a process for the stabilization of aromatic thermoplastic polycarbonates, which comprises adding the stabilizer compositions according to the invention, during or after the preparation of the themoplastic polycarbonates, to the latter in a known manner in amounts of about 0.01 to 1% by weight, relative to the total weight of thermoplastic polycarbonates and stabilizer composition. Preferred amounts by weight are in turn about 0.02 to 0.5% by weight, in particular about 0.02 to 0.3% by weight.

The present invention additionally relates to stabilized aromatic thermoplastic polycarbonates which have been stabilized by the addition of the stabilizer composition according to the invention in amounts of about 0.01 to 1% by weight, relative to the total weight of thermoplastic polycarbonates and stabilizer composition. Preferred amounts by weight are in turn about 0.02 to 0.5% by weight, in particular about 0.02 to 0.3% by weight.

The stabilization according to the invention provides protection against the effect of heat and/or oxygen with, at the same time, a high stability to hydrolysis; in addition, the stabilizer compositions according to the invention also produce a higher stability during processing.

DETAILED DESCRIPTION OF THE INVENTION

Examples of phosphites of the formula (I) suitable according to the invention are those of the formula (Ia) such as didecyl-2,4-di-tert.-butylphenyl phosphite, didodecyl-2-tert.-butyl-4-methylphenyl phosphite, phenyl-bis(2,6-dimethylphenyl) phosphite, tris(2,4-di-tert.-butylphenyl) phosphite, tris(2-cyclohexyl-4-methylphenyl) phosphite, phenyl-bis(2,6-di-tert.-butyl-4-methylphenyl) phosphite, tris(nonylphenyl) phosphite; phosphites of the formula (Ic), wherein $R_5$ is 2-methylphenyl, 2-tert.-butyl-4-methylphenyl, 2,6-di-tert.-butyl-4-methylphenyl, 2,4-di-tert.-butylphenyl or 3,5-di-tert.-butyl-4-hydroxyphenyl; compounds of the formula (Ib4), wherein $R_5$ is phenyl, o-toluyl, p-hydroxyphenyl or 2,6-dimethylphenyl; compounds of the formula (Ib1), wherein $R_5$ is a linear or branched $C_1$-$C_{18}$-alkyl or a $C_6$-$C_{14}$-aryl, which can also have alkyl and/or OH substituents, such as, for example, phenyl, 2,6-di-tert.-butyl-4-methylphenyl or $C_{18}$-$H_{37}$—; compounds of the formula (Ib2), wherein $R_5$ is phenyl or methyl; compounds of the formula (Ib3), wherein $R_5$ is methyl, phenyl, 4-hydroxy-3,5-di-tert.-butylphenyl or 4-methyl-3,5-di-tert.-butylphenyl; and also compounds of the formula (Id), wherein $R_6$ is 2,4-dimethylphenyl, 2,4-di-tert.-butylphenyl, 4-methyl-2-tert.-butylphenyl or 4-methyl-2-cyclohexylphenyl, $R_7$ is H or $CH_3$ and L is a single bond or isopropylidene, such as, for example the following 4 compounds (+ is tert.-butyl):

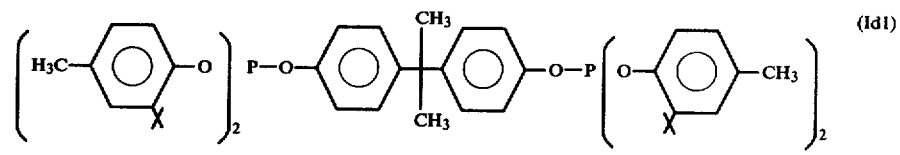

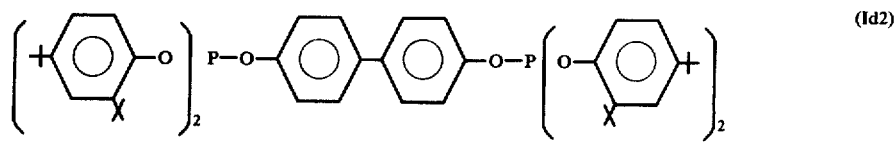

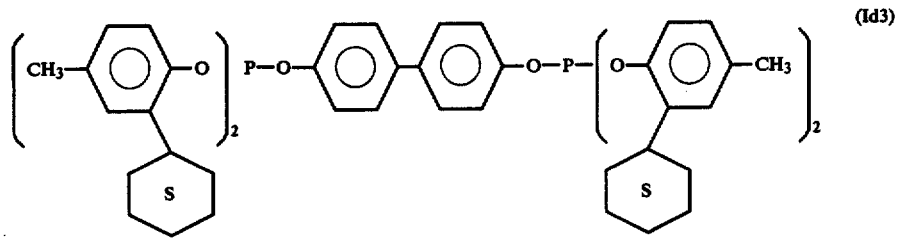

and

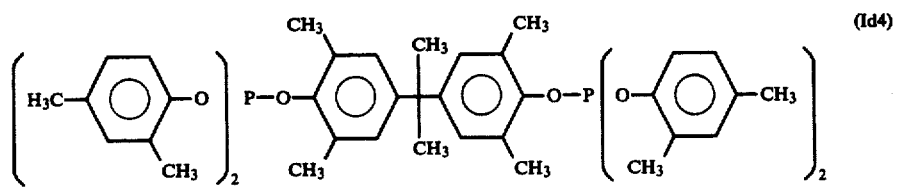

The phosphites of the formula (I) suitable according to the invention are compounds which are known from the literature or which can be prepared by processes known from the literature, for example according to G. M. Kosolapoff, L. Maier, "Organic Phosphorous Compounds", volume 4, pages 255–462 (1972), or according to German Auslegeschrift No. 2,135,238 or according to German Offenlegungsschrift No. 2,056,555.

Examples of siloxanes of the formula (II) suitable according to the invention are the following:

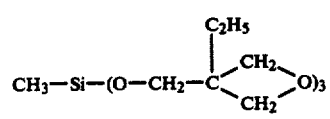

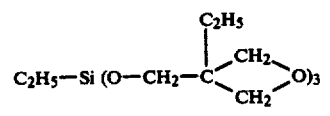

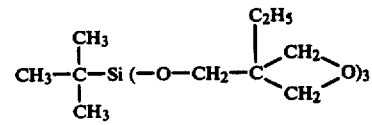

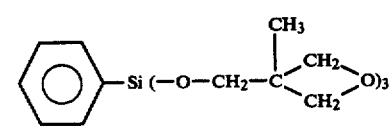

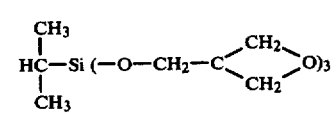

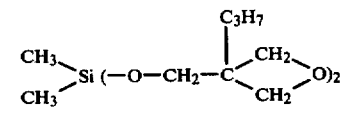

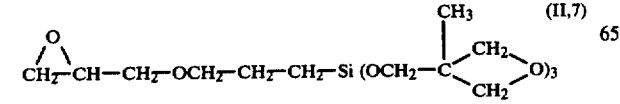

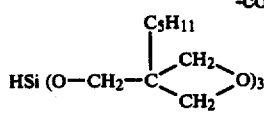

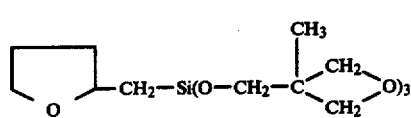

and

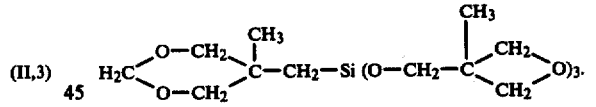

Examples of siloxanes of the formula (IIIa) suitable according to the invention are the following:

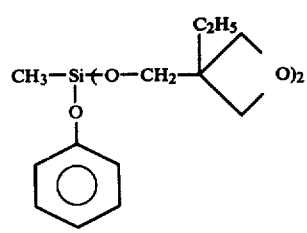

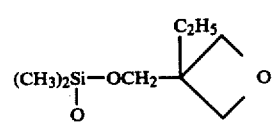

-continued

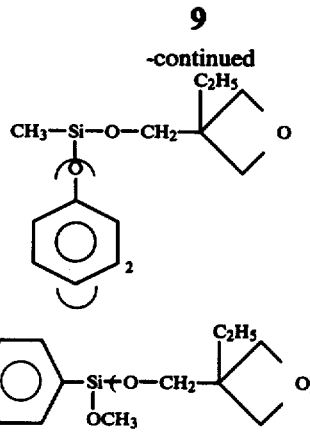

(III,a,3)

(III,a,4)

Examples of siloxanes of the formula (IIIb) suitable according to the invention are the following:

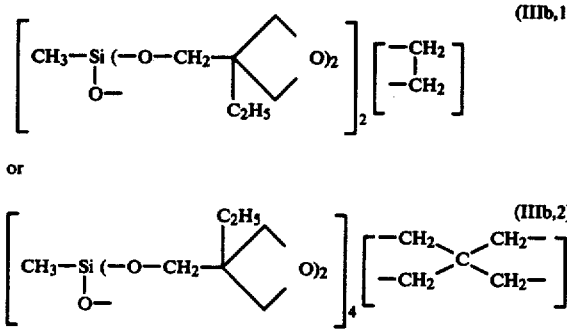

(IIIb,1)

or (IIIb,2)

The siloxanes of the formula (II) and (III) suitable according to the invention are known from the literature or can be prepared by processes known from the literature, for example, by reaction of silicon halides of the formula (IV)

 (IV)

wherein
R, x and y have the meaning mentioned for the siloxanes of the formula (II) and
Hal denotes halogen, for example, chlorine, with oxetane-alcohols of the formula (V)

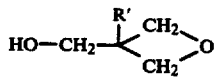 (V)

wherein
R' has the meaning mentioned for the siloxanes of the formula (II),
in the presence of acid-binding agents, for example triethylamine, N,N-dimethylaniline or sodium acetate, and solvents, such as ligroin, toluene, tetrahydrofuran or diethyl ether; or for example by transesterification of alkoxysilanes or phenoxysilanes of the formula (VI)

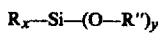 (VI)

wherein
R, R" and x have the meaning mentioned for the siloxanes of the formula (III) and
y is 2 or 3,
with the oxetane-alcohols of the formula (V), optionally in the presence of catalysts such as sodium alcoholate, sodium carbonate, potassium carbonate, titanium tetrabutylate, dibutyl tin oxide, tin(II) acetate, zinc acetate or others.

The phosphites of the formula (I) to be employed according to the invention can be employed either alone or in a mixture. This also applies to the siloxanes of formula (II) to be employed according to the invention and to the siloxanes of formula (III) optionally to be employed in addition.

The thermoplastic aromatic polycarbonates to be stabilized according to the invention and their synthesis are known (see, for example, "H. Schnell, Chemistry and Physics of Polycarbonates, Interscience Publishers, New York, 1964").

The polycarbonates to be stabilized should have mean molecular weights Mw between about 10,000 and 100,000, preferably between about 20,000 and 40,000, found by measuring the relative viscosity in $CH_2Cl_2$ at 25° C. and a concentration of 0.5% by weight. The polycarbonates to be stabilized according to the invention can be linear or branched in known manner.

Examples of suitable diphenols for the preparation of the thermoplastic polycarbonates are hydroquinone, resorcinol, 4,4'-dihydroxydiphenyl, bis(hydroxyphenyl)-alkanes, such as, for example, $C_1$–$C_8$-alkylene or $C_2$–$C_8$-alkylidenebisphenols, bis(hydroxyphenyl)cycloalkanes, such as, for example, $C_5$–$C_{15}$-cycloalkylene or $C_5$–$C_{15}$-cycloalkylidene bisphenols, bis(hydroxyphenyl) sulphides, ethers, ketones, sulphoxides or sulphones. In addition, $\alpha$, $\alpha'$-bis(hydroxy-phenyl) diisopropylbenzene and the corresponding compounds alkylated or halogenated on the nucleus.

Preferred polycarbonates are those based on 2,2-bis(4-hydroxyphenyl)propane (bisphenol A), 2,2-bis-(4-hydroxy-3,5-dichlorophenyl)propane (tetrachlorobisphenol A), 2,2-bis(4-hydroxy-3,5-dibromophenyl)propane (tetrabromobisphenol A), 2,2-bis(4-hydroxy-3,5-dimethylphenyl)propane (tetramethyl-bisphenol A) and 1,1-bis(4-hydroxyphenyl)cyclohexane (bisphenol Z).

Other bisphenols suitable for the preparation of polycarbonates are described, for example, in U.S. Pat. Nos. 3,028,365, 2,999,835, 3,148,172, 2,970,131, 2,991,273, 3,271,367 and 2,999,846.

The stabilizer compositions according to the invention are prepared in a known manner by dissolving the phosphites in the oxetane compounds in the particular ratios of amounts, advantageously excluding atmospheric oxygen.

The stabilization according to the invention of the thermoplastic polycarbonates can be carried out in any desired manner, advantageously, for example, in the course of production of the polycarbonate and, in particular, it can be arranged continuously, since the stabilizers are liquid at room temperature. For this purpose, the stabilizer solution can be added continuously by a suitable delivery pump during the final phase of production in which the molten polycarbonate is continuously freed of solvent under vacuum in a screw conveyor. Moreover, the components of the stabilizer compositions can also be added separately to the polycarbonate. Obviously, it is also possible to stabilize the polycarbonate with the inventive compositions even after production of the polycarbonate, for example, by so-called tumbling; this method is described in the examples in this application and is known from the literature.

The amounts of the stabilizer compositions to be employed are about 0.01 to 1% by weight, preferably between about 0.02 and 0.5% by weight and, in particular, between about 0.02 and 0.3% by weight, in each case relative to the total weight of thermoplastic polycarbonate and stabilizer composition.

The polycarbonates stabilized according to the invention can also contain the known additives, such as, for example, fillers, dyestuffs, pigments and/or other stabilizers.

The thermoplastic polycarbonates stabilized according to the invention can also be mixed with other thermoplastics in a known manner, for example with ABS polymers, polystyrenes, polyarylene sulphones or polyalkylene terephthalates.

The polycarbonates stabilized according to the invention are particularly used when the molded articles produced are exposed to high thermal stress for a relatively long period and they are also used for all articles which are required to have a high light transmittance. This applies particularly to use in lighting engineering, for example for lampshades or glazing with polycarbonate sheets.

The parts mentioned in the examples are parts by weight.

Preparation of a polycarbonate 454 parts of 2,2-bis(p-hydroxyphenyl)propane and 2.5 parts of p-tert.-butylphenol were suspended in 1.5 liters of water in a 3-necked flask, equipped with a stirrer and gas-introduction tube, and then the oxygen was removed from the reaction mixture by passing nitrogen through the reaction mixture for 15 minutes with stirring. Then 355 parts of 45% strength sodium hydroxide solution and 1,000 parts of methylene chloride was added. The mixture was cooled down to 25° C. While maintaining this temperature by cooling, 237 parts of phosgene were added over a period of 120 minutes. After 15 to 30 minutes, or after uptake of phosgene had started, an additional amount of 75 parts of 45% strength sodium hydroxide solution was added. 1.6 parts of triethylamine was added to the solution produced and the mixture was stirred a further 15 minutes. A highly viscous solution was obtained, the viscosity of which was controlled by addition of methylene chloride. The aqueous phase was separated off. The organic phase was washed with water until free of salt and alkali. The polycarbonate was isolated from the washed solution and dried. The polycarbonate had a relative viscosity of 1.29 to 1.30, measured in a 0.5% strength solution in methylene chloride at 25° C. This approximately corresponds to a molecular weight of 32,000. The polycarbonate thus obtained was extruded and granulated.

Preparation of stabilized polycarbonates

The granulated polycarbonate prepared according to the description above was mixed by so-called tumbling with the amounts of stabilizers or stabilizer compositions listed in the table below. The granules were then extruded in a mixing screw at 300° C. to give a strand. This strand in turn was cut up into granules which were processed in an automatic injection molder at 330° C. to give standard test bars.

The following stabilizers or stabilizer compositions were employed:

Comparative tests with:
I. Tris(2,4-di-tert.-butylphenyl) phosphite
II. Tris(2-tert.-butyl-4-methylphenyl) phosphite
III. Mixture of 1 mol of tris(2-tert.-butyl-4-methylphenyl) phosphite and 1.5 mols of octyl silicate
IV. Mixture of 1 mol of tris(4-nonylphenyl) phosphite and
5 mols of 3-amyl-3-hydroxymethyloxetane (according to German Offenlegungsschrift No. 2,510,463)
V. Mixture of 1 mol of tris(2-tert.-butyl-4-methylphenyl) phosphite and 1.5 mols of tetra(3-ethyloxetan-3-yl-methyl) silicate (according to German Offenlegungsschrift No. 2,510,463).

Tests with stabilizer compositions according to the invention:
(A) Solution of 1 mol of tris(2-tert.-butyl-4-methylphenyl) phosphite in 2 mols of methyl-tris(3-ethyloxetan-3-yl-methoxy) silane.
(B) Solution of 1 mol of tris(2,4-di-tert.-butylphenyl)-phosphite and 2 mols of methyl-tris(3-ethyloxetan-3-yl-methoxy) silane
(C) Solution of 1 mol of 4,9-bis-(2,4-di-tert.-butylphenyl)-4,9-di-phospha-3,5,8,10-tetraoxaspiro [5.5]-undecane

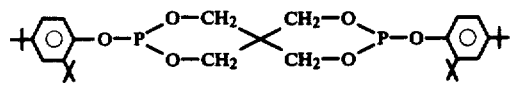

in 4 mols of ethyl-(tris(3-ethyloxetan-3-yl-methoxy)-silane.

Thermal ageing

The test specimens prepared in the manner described above were heat-treated in a drying oven at 140° C. with access of air. From the transmission curves found in the range 400–700 nm using a Zeiss DMC 25 spectrophotometer, the values of the transmission at 420 nm reported and the Yellowness Index according to ASTM D 1925 were determined.

| Stabilizer | Concentration in % by weight | Hours of heat treatment | Yellowness Index ASTM D 1925 | Transmission at 420 nm (DIN 5033 or 4646) |
|---|---|---|---|---|
| without additives | | 0 | 6.6 | 78.6 |
| without additives | | 1000 | 12.0 | 72.0 |
| I | 0.1 | 0 | 4.0 | 83.9 |
| | | 1000 | very dark browning | |
| II | 0.1 | 0 | 4.0 | 82.8 |
| | | 1000 | 44.0 | 34.5 |
| III | 0.1 | 0 | 4.0 | 84.0 |
| | | 1000 | 15.0 | 68.0 |
| IV | 0.1 | 0 | 4.2 | 81.8 |
| | | 1000 | 8.6 | 74.0 |
| V | 0.1 | 0 | 4.1 | 82.6 |
| | | 1000 | 9.0 | 73.5 |
| A | 0.1 | 0 | 4.4 | 82.0 |
| | | 1000 | 8.5 | 75.1 |
| A | 0.2 | 0 | 3.7 | 83.0 |
| | | 1000 | 8.8 | 74.5 |
| B | 0.1 | 0 | 4.1 | 83.3 |
| | | 1000 | 8.8 | 75.0 |
| B | 0.2 | 0 | 4.1 | 83.8 |
| | | 1000 | 9.0 | 74.1 |
| C | 0.1 | 0 | 4.2 | 81.6 |
| | | 1000 | 9.1 | 74.0 |
| C | 0.2 | 0 | 3.8 | 83.5 |
| | | 1000 | 9.2 | 73.3 |

Hydrolysis test

A number of molded articles of polycarbonate, which have been produced with and without stabilizers, having the dimensions 50×6×4 mm (so-called standard small bars) were placed in boiling distilled water in an electrically heated round-bottomed flask. 10 bars were removed on each occasion after the passage of specified periods of time and the relative solution viscosity (in $CH_2-Cl_2$ at 25° C. and a concentration of 0.5% by weight) was measured. The average values obtained from the individual measurements on the 10 bars are listed in the following table.

| Stabilizer | Concentration in % by weight | Boiling Time | | | |
|---|---|---|---|---|---|
| | | 250 hours | 500 hours | 750 hours | 1,000 hours |
| no addition | | 1.270 | 1.258 | 1.250 | 1.242 |
| I | 0.1 | 1.210 | 1.174 | — | — |
| II | 0.1 | 1.170 | — | — | — |
| III | 0.1 | 1.260 | — | 1.220 | 1.205 |
| IV | 0.1 | 1.250 | 1.220 | 1.193 | 1.170 |
| V | 0.1 | 1.260 | 1.230 | 1.220 | 1.210 |
| A | 0.1 | 1.268 | 1.265 | 1.262 | 1.256 |
| A | 0.2 | 1.268 | 1.261 | 1.255 | 1.250 |
| B | 0.1 | 1.273 | 1.266 | 1.260 | 1.254 |
| B | 0.2 | 1.270 | 1.260 | 1.250 | 1.245 |
| C | 0.2 | 1.263 | 1.259 | 1.245 | 1.238 |

It can be seen from this that the degradation in molecular weight on hydrolysis of the polycarbonate stabilized according to the invention is less than that with un-stabilized materials, and that the degradation is markedly less than for a polycarbonate only stabilized with phosphite.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stabilizer composition comprising
   (a) a phosphite of the formula (I), (a, b, c, and/or d)

$$R_1-O-P-O-R_2$$
$$|$$
$$O-R_3$$ (Ia)

(Ib)

(Ic)

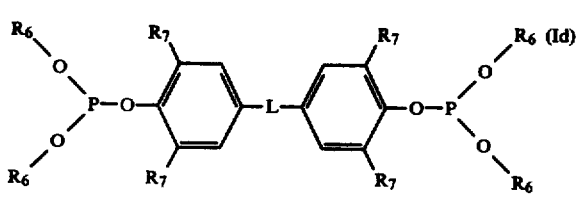

(Id)

with (b) a siloxane compound of the formula (II) which is liquid at room temperature

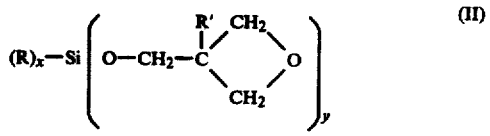

(II)

wherein the equivalent weight per oxetane group is less than 180, wherein
   $R_1$, $R_2$ and $R_3$ are linear or branched $C_1-C_{18}$-alkyls or optionally substituted $C_6-C_{20}$-aryls with the proviso that at least one of the radicals $R_1$, $R_2$ or $R_3$ is an aryl radical;
   $R_4$ is a $C_2-C_5$-alkylene or a divalent radical of a $C_6-C_{30}$-aryl ring system;
   $R_5$ is a linear or branched $C_1-C_{18}$-alkyl, a $C_5-C_{14}$-cycloalkyl or a $C_6-C_{20}$-aryl radical, which may also contain alkyl and/or hydroxyl substituents, with the proviso that at least one C atom, which is directly bonded to the oxygen of the phosphorus acid, of each of the possible radicals $R_4$ and $R_5$ is a constituent of an aromatic ring;
   $R_6$ is a substituted or unsubstituted $C_6-C_{14}$-aryl;
   $R_7$ is H or $C_1-C_4$-alkyl;
   —L— is —O—, a $C_1-C_6$-alkylidene or a single bond;
   R is H or a linear or branched $C_1-C_{14}$-alkyl, which may contain ether oxygen atoms, a $C_5-C_{14}$-cycloalkyl, which may be alkyl-substituted, or a substituted or unsubstituted $C_6-C_{14}$-aryl;
   $R'$ is a $C_1-C_6$-alkyl, a $C_5-C_6$-cycloalkyl or phenyl; and
   x is 1 or 2, y is 2 or 3 and $x+y=4$, and wherein the ratio of mixing of the siloxane component to the phosphite component corresponds to 1 to 10 oxetane-group equivalents per mole of phosphorus.

2. The stabilizer composition according to claim 1, characterized in that the mixing ratio of the siloxane component to the phosphite component corresponds to 4 to 8 oxetane-group equivalents per mole of phosphorus.

3. The stabilizer composition according to claim 1 which contains not only a siloxane of the formula (II), but also a mixture of siloxanes of formula (III) (a) and/or (b)

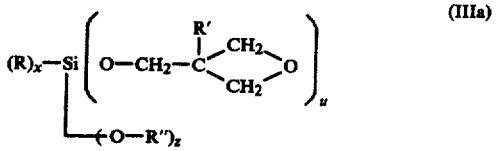

(IIIa)

wherein the equivalent weight per oxetane group of the combination of the siloxanes of formula (II) and of formula (III) is less than 180, and wherein
   R, $R'$ and x have the meaning mentioned in claim 1 for formula (II);
   $R''$ is $C_1-C_2$-alkyl or aryl;
   A is the radical obtained by the removal of the hydroxyl groups from a polyhydric aliphatic alcohol having 2 to 6 hydroxyl groups;
   u is zero, 1 or 2;
   z is 1, 2 or 3;
   $x+u+z=4$; and
   b is a whole number from 2 to 6.

4. The stabilizer composition according to claim 1 characterized in that the equivalent weight per oxetane group is less than about 160.

5. A process for the stabilization of an aromatic thermoplastic polycarbonate, characterized in that the stabilizer composition of claim 1 is added to the thermoplastic polycarbonate either during or after the production of polycarbonate, in an amount from about 0.01 to 1% by weight relative to the total weight of thermoplastic polycarbonate and stabilizer composition.

6. A stabilized aromatic thermoplastic polycarbonate comprising
    (a) an aromatic thermoplastic polycarbonate and
    (b) the stabilizer composition of claim 1
wherein component (b) is present in an amount from about 0.01 to 1% by weight relative to the total weight of the aromatic thermoplastic polycarbonate and the stabilizer composition.

* * * * *